United States Patent [19]
Picmaus

[11] 3,728,567
[45] Apr. 17, 1973

[54] WINDINGS FOR MULTIPLE-MOTOR UNIT

[75] Inventor: Ernst Picmaus, 6710 Frankenthal/Pfalz, Germany

[73] Assignee: Klein, Schanzlin & Becker Aktiengesellschaft, Frankenthal/Pfalz, Germany

[22] Filed: Sept. 24, 1971

[21] Appl. No.: 183,506

[30] Foreign Application Priority Data

Sept. 30, 1970 Germany.....................P 20 48 063.1

[52] U.S. Cl. .....................310/198, 310/112, 318/49
[51] Int. Cl. ..............................................H02k 3/00
[58] Field of Search......................310/112, 114, 126, 310/198–207, 184; 318/49

[56] References Cited

UNITED STATES PATENTS 2,444,077  6/1948  Weathers...........................318/49 X

*Primary Examiner*—D. F. Duggan
*Attorney*—Michael S. Striker

[57] ABSTRACT

At least two electric motors are connected for operation in unison and each has a winding carrier provided with a plurality of grooves. A winding is provided on each of the carriers and comprises $n$ conductors in at least one of the grooves of one of the carriers and $n+1$ conductors in the remaining ones of the grooves. A separate conductor is located in the one groove of the one carrier and is electrically conductively connected with the windings of both carriers.

5 Claims, 2 Drawing Figures

WINDINGS FOR MULTIPLE-MOTOR UNIT

BACKGROUND OF THE INVENTION

The present invention relates generally to multiple-motor units, and more particularly to a winding arrangement for multiple-motor units, especially those which are used in circumstances where the cross-sectional space available for housing the motor unit is limited. Still more particularly the invention is concerned with a multiple-motor unit in which motors for underwater applications are mounted in tandem arrangement.

Motors for underwater applications are particularly used for submersible pumps, where the outer diameter of such motors is generally limited by the diameter of the pipe into which the pump and the motors must be inserted. Particularly if the submersible pump is to be mounted at a very deep level, it can and frequently does occur that the power requirements of the pump are no longer met by a single motor because the length of the lamellae packet cannot be increased at will.

For such circumstances it is already known, for instance from German Pat. No. 1,049,969, to provide two or more electrical motors which are arranged one behind the other and act upon a common shaft, that is their shafts are mechanically coupled with one another so that they jointly drive the pump. In the aforementioned prior-art construction, as well as in other similar ones, each motor winding receives power separately from the source of electrical energy. This, however, means that the power supply cable must be passed outwardly past the upper motor and any other additional motors which may be located above the lowermost or terminal motor; alternately, the power supply cable must be passed between the stator packet and the tubular housing. Both possibilities are either made entirely impossible by the very limited space available, or can be carried out only with the greatest of difficulty and, consequently, expense.

Given the problems here involved, attempts have of course been made to provide different solutions, and one possibility which has offered itself is to connect only the beginnings of the winding of the uppermost or first motor with the power supply cable, and to connect the ends of this winding with the beginnings of the winding of the next-following or next-lower motor. However, the result of such a construction brings with it a very significant disadvantage, namely per phase one groove will have one conductor less than the other grooves of the same winding carrier. Particularly if motors are involved which have few conductors per groove in the winding carrier, this means that the voltage production in the winding is decreased by the value of half a winding, and asymmetry is developed in the ampere-winding distribution which is undesired in rotary current asynchronous motors. Moreover, only a Y-connection of the total winding arrangement can then be carried out.

SUMMARY OF THE INVENTION

It is, accordingly, an object of the present invention to overcome the disadvantages of the prior art.

More particularly it is an object of the present invention to provide, in a multiple-motor unit of the type under discussion, a winding arrangement which overcomes these disadvantages.

Still more particularly it is an object of the present invention to provide such a winding arrangement which, despite the very limited space availabilities given under the circumstances involved, affords a uniform winding of the grooves with active conductors, and thereby a uniform ampere-winding distribution over the entire circumference of the stator bore, without utilizing the above-described disadvantageous ways of supplying electric current to the second or any subsequent motors located beneath the uppermost motor.

A concomitant object of the invention is to provide such an arrangement which can be utilized not only for a Y-connection but also for a delta-connection.

In pursuance of the above objects, and of others which will become apparent hereafter, one feature of the invention resides in a multiple-motor unit which, briefly stated, comprises at least two electric motors connected for operation in unison and each comprising a winding carrier provided with a plurality of grooves. A winding on each of the carriers is provided, and comprises $n$ conductors in at least one of the grooves of one of the carriers and $n+1$ conductors in the remaining ones of the grooves of the one carrier. Separate conductor means is provided in the one groove of the one carrier and electrically conductively connected with the windings of both of the carriers.

If more than two electric motors are provided, each except the last or lowermost one, is provided with the separate conductor means through which the phase current flows and which cooperates in the voltage generation without requiring additional space.

By displacing the end points of series-connected windings or winding groups of the motors from the last or lowermost motor in the cable-connecting space of the first or uppermost motor, it is possible to avoid the necessity for passing the current supply cable past the outer side of the motors. This in itself is a significant advantage, because such a cable is of course subject to damage—for instance if it passes between the motors and the inner side of a pump conduit, aside from the fact that it requires additional space. It is also possible to eliminate the difficult passage of the cable between the stator packet and the tubular housing. In addition, however, the invention achieves the desired uniform and symmetrical ampere-winding distribution over the entire circumference of the stator bore of all motors, and does so while permitting the maximum possible voltage generation because all grooves are now provided with active conductors without any exceptions.

The invention furthermore achieves that, for instance in the case of tandem motors, for the phase UX by means of the separate conductor in the first or uppermost motor and the connection of the winding end $X_2$ of the second or successive motor with the conductor connection $X'$ of the first motor the end X of the total phase UX is located available at the connecting side of the first motor for connection of a Y- or delta-connection. The same is true for the phases VX and WZ. This means that it is possible not only to provide a Y-connection for the total winding arrangement, but the desired and very advantageous Y-delta connection can also be obtained for the starting operation because the three terminals as well as the three ends of the total winding are available at the upper winding head of the first motor.

If more than two sequentially connected motors are provided, the same advantages are obtained by appropriate utilization of such separate conductors in not fully wound groove of all motors with the exception of the last one, and by series connection of the respective separate conductors of each winding branch.

For reasons having to do with the technology of winding it is under some circumstances necessary—especially in underwater motors of higher output—to provide a subdivision into several parallel branches. This also can be achieved with the present invention. The windings of the individual motors consist, depending on the number of poles, to a corresponding number of groups which can be connected in parallel. The identical groups of the connected motors must be connected in series and together constitute a complete winding branch. This number of winding branches, which corresponds to the number of groups which can be connected in parallel, can then be in turn connected in parallel at the winding head of the first motor.

The novel features which are considered as characteristic for the invention are set forth in particular in the appended claims. The invention itself, however, both as to its construction and its method of operation, together with additional objects and advantages thereof, will best be described and understood from the following description of specific embodiments when read in connection with the accompanying drawings.

DESCRIPTION OF THE PREFERRED EMBODIMENTS

Figure 1:
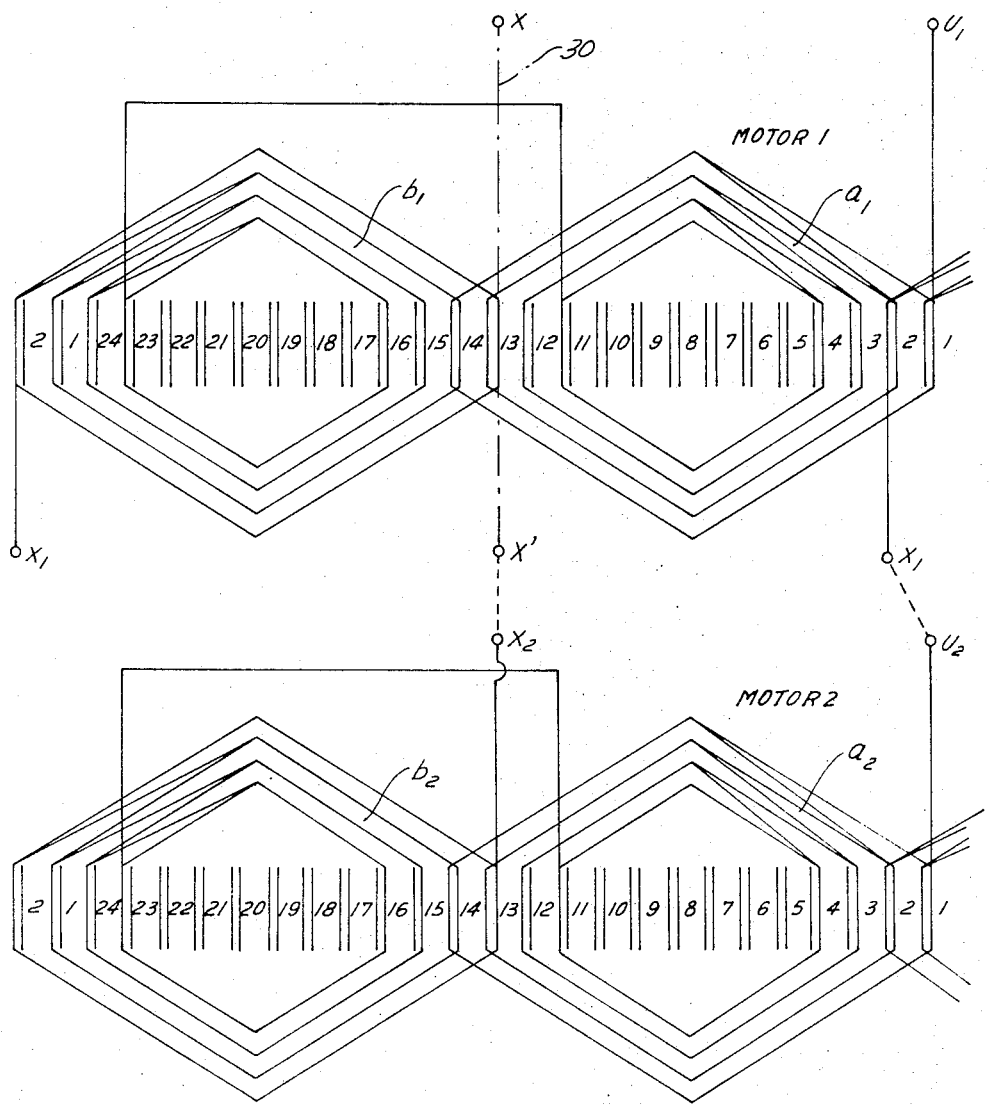
FIG. 1 is a diagrammatic illustration of the two-pole stator winding of two motors in which all groups are connected in series.
Figure 2:
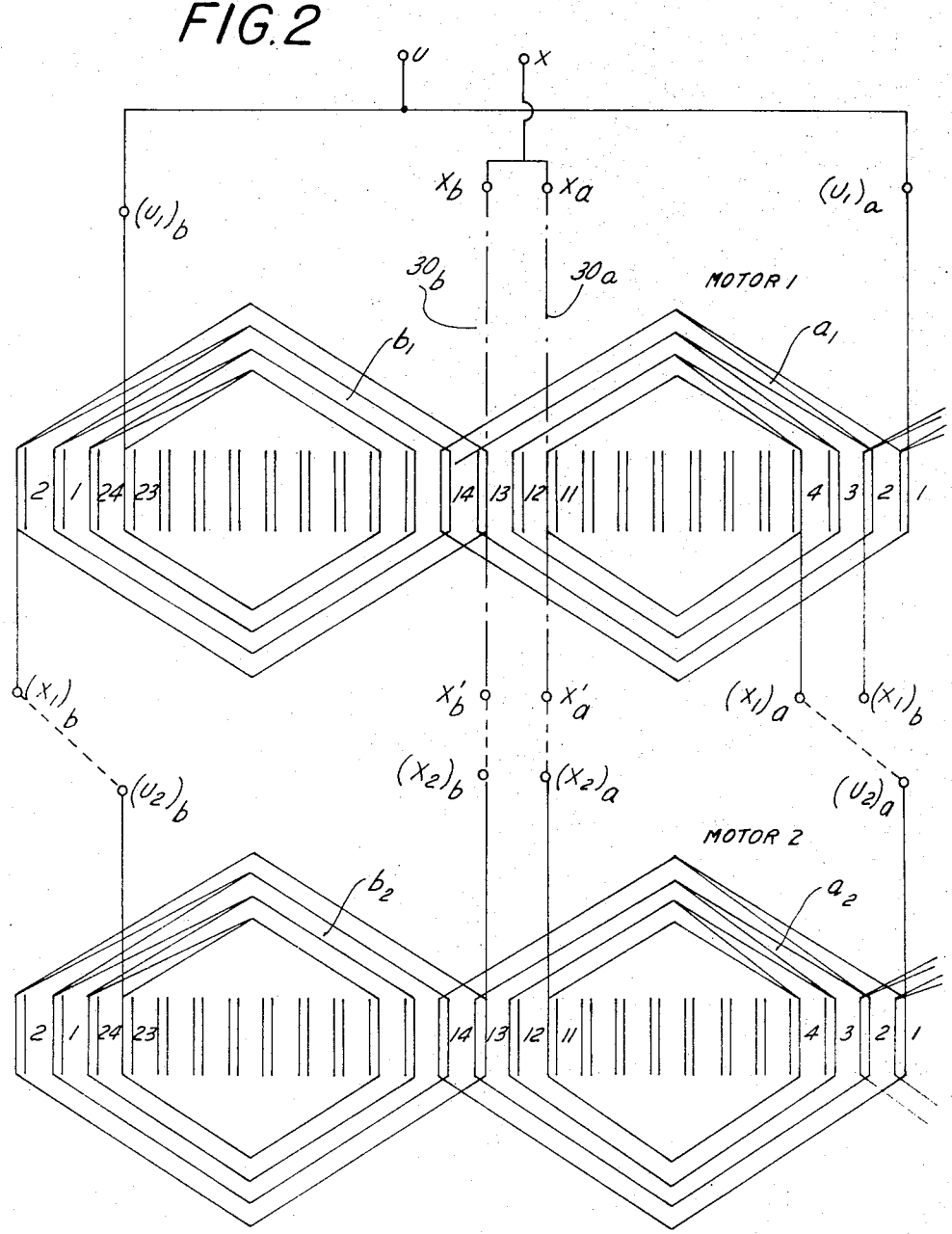
FIG. 2 is a similar diagrammatic illustration of a two-pole stator winding, with one group of each motor being connected in series and the two winding branches thus obtained being connected in parallel.

It will be noted that in the drawing, in FIG. 1 as well as in FIG. 2, the winding arrangement is illustrated on the developed circumference of the stator bores of two motors of a tandem arrangement.

In the embodiment in FIG. 1 the number of stator grooves, that is of the winding carriers, is $N_1 = 24$ and the pole number is $2p = 2$. The winding of the phase UX is illustrated, in form of a two-layer winding with coils of unequal width. The winding of the first motor begins at $U_1$ in groove 1 and would normally terminate at $X_1$ coming out of groove 13, with the two groups $a_1$ and $b_1$ being connected in series. However, in order to have the end of $X_1$ available at the lower winding head, it is diverted out of groove 2, so that in groove 13 a conductor will be missing.

The winding of the second motor begins with $U_2$ in groove 1 and terminates in conventional manner with $X_2$ emerging from groove 13; in this case, also, groups $a_2$ and $b_2$ are connected in series. The end $X_1$ is connected with the beginning terminal $U_2$.

According to the invention, and in order for the end $X_2$ of the second motor to be passed through the first motor to the upper winding head which is the connecting side, the groove 13 of the first motor has inserted into it in place of the missing conductor of the winding a similar but separate conductor 30, which has ends X' at the lower and X at the upper winding head. The end $X_2$ of the second winding is now connected with the end X' of the separate conductor 30, and the end of the total winding X is now available at the connecting side of the first motor. The phase current flows through the separate conductor 30 just as through all the other conductors of the winding phase, and the current volume of groove 13 of the first motor is thus equal to a normal winding arrangement. In addition, the conductor 30 or X', X also participates in completely normal manner in the voltage generation so that the total winding is fully effective in this respect also.

It is pointed out that the arrangement of the non-illustrated phases VY and WZ is completely identical with that illustrated, but phase-shifted electrically through 120°. According to the invention, the length of the conductor extending from $U_1$ to the upper winding carrier constitutes a first conductor; the conductor extending from $X_1$ to $U_2$ is a second conductor; and the conductor passing from $X^1$ to X constitutes a third conductor.

Coming to the embodiment in FIG. 2 it will be seen that this shows a different winding arrangement of the two motors in a tandem construction which is otherwise identical with that in FIG. 1, the purpose being to obtain two parallel winding branches. Contrary to the embodiment in FIG. 1, FIG. 2 shows that the group $a_1$ of the first motor and the group $a_2$ of the second motor are connected in series and the separate conductor $X'_a$, $X_a$ (which is designated in FIG. 2 with reference numeral 30a) is passed through the groove 11 of the first motor. Analogously thereto the group $b_1$ is connected in series with the group $b_2$ and the separate conductor $X'_b$, $X_b$ (designated with reference numeral 30b in FIG. 2) is passed through the groove 13 of the first motor. This makes it possible to connect the two winding branches $a_1$, $a_2$ and $b_1$, $b_2$ thus obtained, in parallel at the upper winding head of the first motor. Here, also, it is possible to freely choose either a Y-connection or a delta-connection because in this embodiment also all starting and end points of the winding phases are available at the upper winding head of the first motor.

The two separate conductors 30a and 30b of FIG. 2 also achieve a symmetrical ampere-winding distribution and participate in the voltage generation.

It will be understood that each of the elements described above, or two or more together, may also find a useful application in other types of constructions differing from the types described above.

While the invention has been illustrated and described as embodied in a multiple-motor unit, it is not intended to be limited to the details shown, since various modifications and structural changes may be made without departing in any way from the spirit of the present invention and, therefore, such adaptations should and are intended to be comprehended within the meaning and range of equivalence of the following claims.

What is claimed as new and desired to be protected by Letters Patent is set forth in the appended claims.

I claim:

1. In a plural motor unit, a winding arrangement, comprising, in combination at least two axially spaced coaxial circular winding carriers each having about its circumference a plurality of circumferentially spaced generally axially extending slots; phase windings wound about each of said winding carriers passing through said slots thereof in such a manner that the number of phase winding conductors passing through at least one slot of one of said phase winding carriers is smaller than the number of phase winding conductors passing through the remainder of the slots of said one winding carrier; a first conductor connected to said phase windings of said one winding carrier projecting from one face thereof; at least one second conductor connecting said phase windings on said one winding carrier with said phase windings on the other winding carrier; and a third conductor connected to said phase windings of said other winding carrier and extending through said one slot of said one winding carrier to and beyond said one face thereof.

2. In a plural motor unit as defined in claim 1 wherein said second conductor connects a phase winding on said one winding carrier in series with a phase winding on said other winding carrier to constitute series-connected phase windings, and wherein said first conductor and said third conductor both accessible at said one face constitute accessible ends of said series-connected phase windings.

3. In a plural motor unit as defined in claim 1, wherein corresponding phase windings of each of said carriers are connected in series to form series-connected phase windings.

4. In a plural motor unit as defined in claim 1, wherein corresponding phase windings of each of said carriers are connected in series to form a plurality of series-connected phase windings and wherein said series-connected phase windings are connected to each other in parallel.

5. In a plural motor unit, a winding arrangement, comprising, in combination, a plurality of axially spaced coaxial circular winding carriers each having about its circumference a plurality of circumferentially spaced generally axially extending slots, and said plurality of winding carriers including an endmost carrier having a free axial side opposite to the side thereof facing the adjoining winding carrier; a plurality of phase windings each including at least one phase-winding conductor having one end accessible at said free axial side and being wound at least around slots of a carrier other than said endmost carrier and then passing back through a slot of said endmost carrier to said free axial side and having another end also accessible at said free axial side, whereby to permit access to both ends of each phase winding, and the phase-winding conductors of said phase windings being so wound that all the slots of each of said carriers accommodate the same number of runs of conductor.

* * * * *